(12) United States Patent
Yamakawa et al.

(10) Patent No.: US 7,995,445 B2
(45) Date of Patent: Aug. 9, 2011

(54) OPTICAL PICKUP APPARATUS, REPRODUCTION APPARATUS, AND REPRODUCTION METHOD

(75) Inventors: Akio Yamakawa, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 12/651,715

(22) Filed: Jan. 4, 2010

(65) Prior Publication Data

US 2010/0172002 A1 Jul. 8, 2010

(30) Foreign Application Priority Data

Jan. 6, 2009 (JP) ................... 2009-000740

(51) Int. Cl.
*G11B 7/00* (2006.01)

(52) U.S. Cl. .................................... 369/103
(58) Field of Classification Search ........ 369/103, 369/112.01, 112.1, 112.23, 44.23, 44.24
See application file for complete search history.

(56) References Cited

U.S. PATENT DOCUMENTS 7,782,732 B2 * 8/2010 Minabe et al. ............... 369/103

FOREIGN PATENT DOCUMENTS

| JP | 2007-079438 | 3/2007 |
| JP | 4289921 | 4/2009 |

* cited by examiner

*Primary Examiner* — Nabil Z Hindi
(74) *Attorney, Agent, or Firm* — Wolf, Greenfield & Sacks, P.C.

(57) ABSTRACT

An optical pickup apparatus includes: a light source to irradiate light onto a hologram recording medium onto which information is recorded by interference fringes of signal light and reference light; a spatial light modulation portion to generate the reference light by performing a spatial light modulation on the light from the light source; and an optical system to irradiate the reference light onto the hologram recording medium via a relay lens system and an objective lens and guide reproduction light obtained from the hologram recording medium in accordance with the irradiation of the reference light to an image pickup device via the objective lens and the relay lens system, the optical system being provided with, in an optical path between the relay lens system and the image pickup device, an angle permselective device that selectively transmits light with an incidence angle of a predetermined angle or less.

8 Claims, 13 Drawing Sheets

Recording

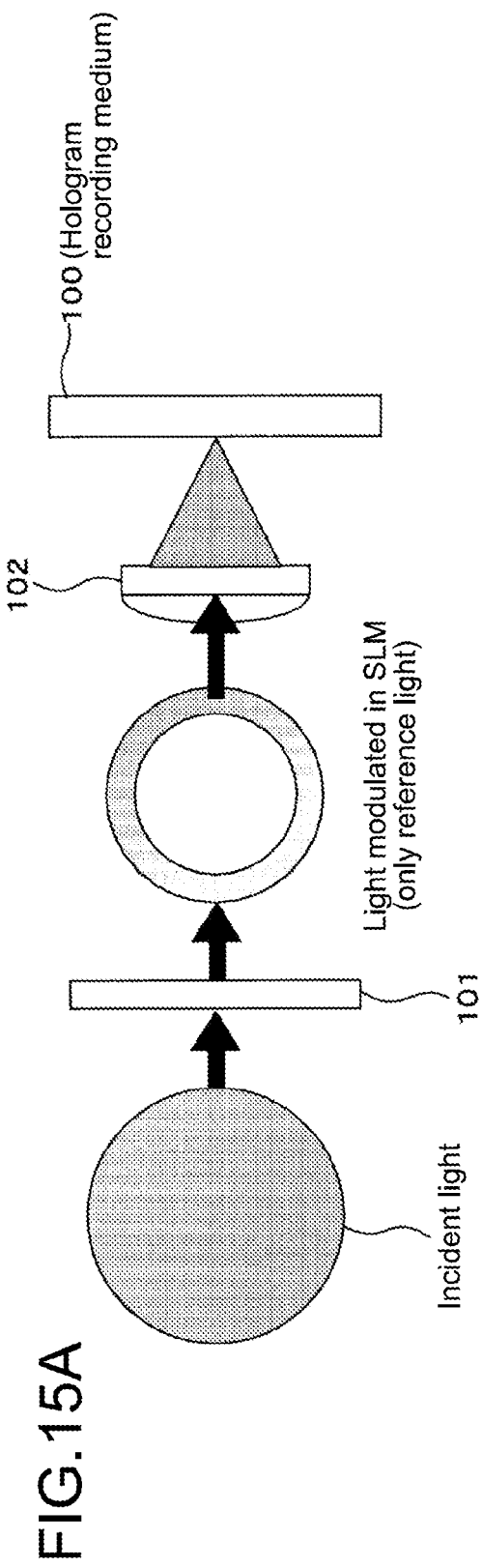
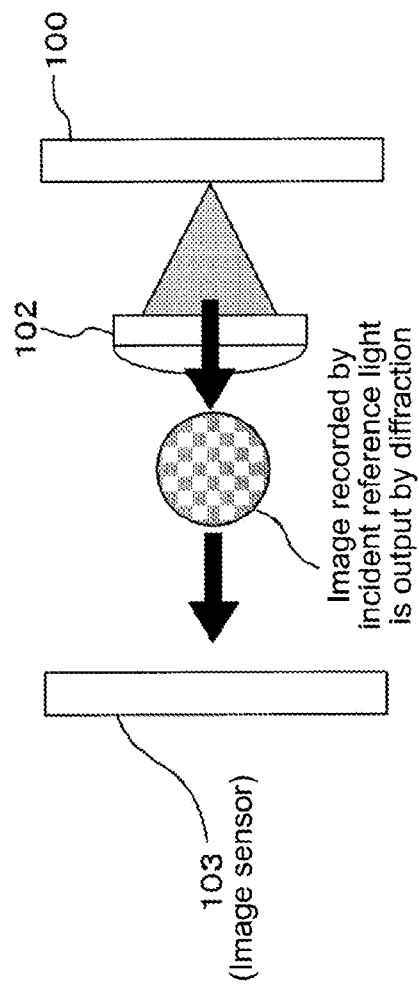
FIG.15A
FIG.15B

OPTICAL PICKUP APPARATUS, REPRODUCTION APPARATUS, AND REPRODUCTION METHOD

BACKGROUND OF THE INVENTION

1. Field of the Invention

The present invention relates to an optical pickup apparatus and a reproduction apparatus for irradiating reference light onto a hologram recording medium onto which information is recorded by interference fringes of signal light and the reference light, and also to a reproduction method for reproducing information from the hologram recording medium.

2. Description of the Related Art

As disclosed in Japanese Patent Application Laid-open No. 2007-79438, for example, there is known a hologram recording and reproduction system that records data by forming holograms. In the hologram recording and reproduction system, by generating, during recording, signal light subjected to a spatial light intensity modulation (intensity modulation) corresponding to recording data and reference light imparted with a predetermined optical intensity pattern and irradiating the generated signal light and reference light onto a hologram recording medium, holograms are formed on the recording medium so that data is recorded.

During reproduction, the reference light is irradiated onto the recording medium. By thus irradiating the same reference light as in the recording (having same intensity pattern as that used in recording) onto the holograms formed in accordance with the irradiation of the signal light and the reference light during the recording, diffracted light corresponding to recorded signal light components is obtained. In other words, a reproduced image (reproduction light) corresponding to recording data is obtained. By detecting the thus-obtained reproduction light using an image sensor such as a CCD (Charge Coupled Device) sensor and a CMOS (Complementary Metal Oxide Semiconductor) sensor, the recorded data can be reproduced.

Moreover, as such a hologram recording and reproduction system, there is known a so-called coaxial system in which reference light and signal light are arranged on the same optical axis and irradiated onto a hologram recording medium via a common objective lens.

FIGS. 14 and 15 are diagrams for explaining hologram recording/reproduction in the coaxial system. FIG. 14 schematically shows a recording technique, and FIG. 15 schematically show a reproduction technique.

It should be noted that in FIGS. 14 and 15, a case where a reflection-type hologram recording medium 100 including a reflective film is used is exemplified.

First, in the hologram recording and reproduction system, an SLM (Spatial Light Modulator) 101 is provided for generating signal light and reference light during recording and generating reference light during reproduction as shown in FIGS. 14 and 15. The SLM 101 includes an intensity modulator that performs an optical intensity modulation on incident light in a pixel unit. The intensity modulator can be constituted of, for example, a liquid crystal panel.

During the recording in FIG. 14, by an intensity modulation of the SLM 101, signal light imparted with an intensity pattern corresponding to recording data and reference light imparted with a predetermined intensity pattern are generated. In the coaxial system, a spatial light modulation is performed on incident light so that the signal light and the reference light are arranged on the same optical axis as shown in the figure. At this time, in general, the signal light is arranged on an inner side whereas the reference light is arranged on an outer side as shown in FIG. 14.

The signal light and the reference light generated by the SLM 101 are irradiated onto the hologram recording medium 100 via an objective lens 102. Accordingly, holograms onto which recording data is reflected are formed on the hologram recording medium 100 by interference fringes of the signal light and the reference light. In other words, data recording is performed by forming holograms.

On the other hand, during the reproduction, the SLM 101 generates reference light (intensity pattern of reference light at this time is same as that used in recording) as shown in FIG. 15A. Then, the reference light is irradiated onto the hologram recording medium 100 via the objective lens 102.

By thus irradiating the reference light onto the hologram recording medium 100, diffracted light corresponding to the holograms formed on the hologram recording medium 100 is obtained as shown in FIG. 15B, with the result that a reproduced image (reproduction light) for the recorded data can be obtained. In this case, the reproduced image is guided to an image sensor 103 as reflected light from the hologram recording medium 100 via the objective lens 102 as shown in the figure.

The image sensor 103 receives the reproduced image guided as described above in a pixel unit and obtains an electrical signal corresponding to an amount of the received light for each pixel to thus obtain a detection image with respect to the reproduced image. An image signal thus detected by the image sensor 103 becomes a read-out signal for the recorded data.

It should be noted that as can be seen from FIGS. 14 and 15, in the hologram recording and reproduction system, recording data is recorded/reproduced in a unit of signal light. In other words, in the hologram recording and reproduction system, one hologram (called hologram page) formed by a single interference of signal light and reference light is a minimum unit for recording/reproduction.

SUMMARY OF THE INVENTION

As described above, in the hologram recording and reproduction system, reference light is irradiated onto the hologram recording medium during reproduction to thus obtain reproduction light corresponding to information (signal light) recorded onto the hologram recording medium.

Here, by irradiating the reference light during the reproduction, while reproduction light is output from the hologram recording medium by a diffraction, scattered light is also caused. Moreover, during the reproduction, scattered light is also caused by dusts adhered onto a lens or optical device provided in an optical path.

The scattered light caused during the reproduction as described above is guided to the image sensor (image pickup device) together with reproduction light, to thus cause marked deterioration in an SN ratio. Therefore, it is desirable to suppress the scattered light as described above during the reproduction.

According to an embodiment of the present invention, there is provided an optical pickup apparatus including:

a light source to irradiate light onto a hologram recording medium onto which information is recorded by interference fringes of signal light and reference light;

a spatial light modulation portion to generate the reference light by performing a spatial light modulation on the light from the light source; and an optical system structured to irradiate the reference light generated by the spatial light modulation portion onto the hologram recording medium via a relay lens system and an objective lens and guide reproduction light obtained from the hologram recording medium in accordance with the irradiation of the reference light to an image pickup device via the objective lens and the relay lens system.

In the optical pickup apparatus, the optical system is provided with, in an optical path between the relay lens system and the image pickup device, an angle permselective device that selectively transmits light with an incidence angle of a predetermined angle or less.

According to an embodiment of the present invention, there is provided a reproduction apparatus including:

an optical pickup including a light source to irradiate light onto a hologram recording medium onto which information is recorded by interference fringes of signal light and reference light, a spatial light modulation portion to generate the reference light by performing a spatial light modulation on the light from the light source, and an optical system structured to irradiate the reference light generated by the spatial light modulation portion onto the hologram recording medium via a relay lens system and an objective lens and guide reproduction light obtained from the hologram recording medium in accordance with the irradiation of the reference light to an image pickup device via the objective lens and the relay lens system, the optical system being provided with, in an optical path between the relay lens system and the image pickup device, an angle permselective device that selectively transmits light with an incidence angle of a predetermined angle or less; and a reproduction portion to reproduce the information recorded onto the hologram recording medium based on a result of the light reception by the image pickup device.

Here, although descriptions will be given later in detail, in the hologram recording and reproduction system in which signal light and reference light generated by the spatial light modulator are irradiated onto the hologram recording medium via the relay lens system and the objective lens, a light beam emitted from each pixel of the spatial light modulator becomes light that is diffused at a certain angle (θ) as shown in FIG. 6, for example. Thus, also a light beam of reproduction light of each pixel that is guided to the image pickup device via the relay lens system during the reproduction becomes light that converges at the angle (θ) in association therewith. As a matter of course, necessary for data reproduction is only light beams of reproduction light that converge and enter the image pickup device as described above. Thus, if light having a larger incidence angle than the light beams of the reproduction light can be suppressed, most of the scattered light that enters the image pickup device can be suppressed.

In view of this point, the angle permselective device that selectively transmits light with an incidence angle of a predetermined angle or less is provided in the optical path between the relay lens system and the image pickup device as described above. As a result, scattered light to be received by the image pickup lens can be suppressed effectively.

According to the embodiments of the present invention, it is possible to effectively suppress scattered light that is received by an image pickup device together with reproduction light in reproducing a hologram recording medium, and thus improve an SN ratio.

These and other objects, features and advantages of the present invention will become more apparent in light of the following detailed description of best mode embodiments thereof, as illustrated in the accompanying drawings.

BRIEF DESCRIPTION OF DRAWINGS

FIG. 15 are diagrams for explaining a hologram reproduction technique in the coaxial system.

DESCRIPTION OF PREFERRED EMBODIMENTS

Hereinafter, an embodiment of the present invention will be described with reference to the drawings.

It should be noted that descriptions will be given in the following order.

<1. Hologram recording and reproduction system of this embodiment>

<2. Behavior of light in optical path>

<3. Generation and suppression of scattered light>

(3-1. Method of suppressing scattered light)

(3-2. Specific structural example for suppressing scattered light)

<4. Modified example>

<1. Hologram Recording and Reproduction System of this Embodiment>

Figure 1:
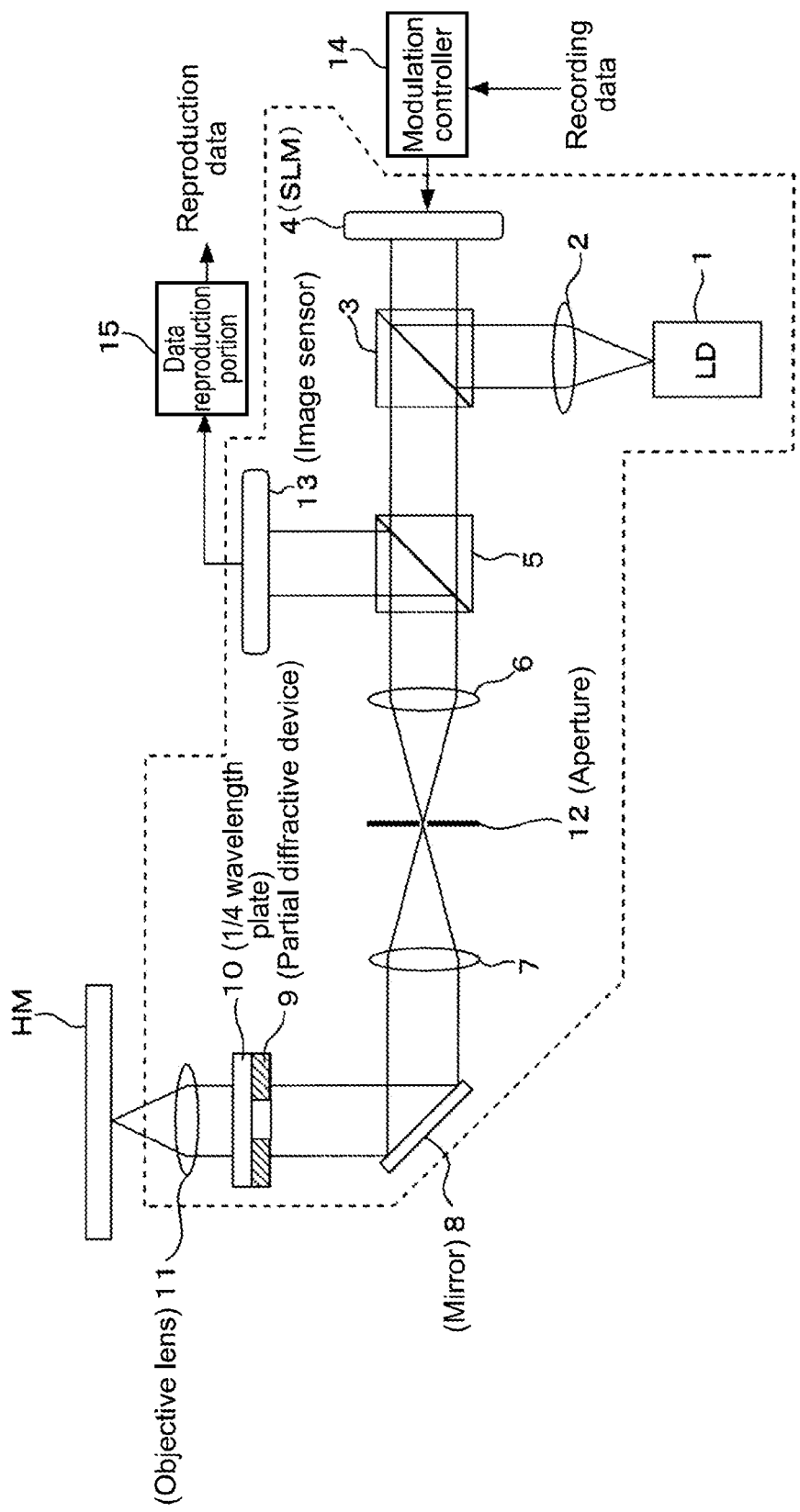
FIG. 1 is a diagram showing an internal structure of a reproduction apparatus according to an embodiment of the present invention.

FIG. 1 is a diagram showing an internal structure of a recording/reproduction apparatus according to an embodiment of the present invention.

In this embodiment, a case where a reproduction apparatus according to the present invention is applied to the recording/reproduction apparatus including a hologram recording function will be exemplified. FIG. 1 mainly shows a structure of an optical system of the recording/reproduction apparatus of this embodiment.

A hologram recording medium HM shown in FIG. 1 is a recording medium onto which information is recorded by interference fringes of signal light and reference light.

Here, referring to FIG. 2, a structure of the hologram recording medium HM will be described briefly. It should be noted that FIG. 2 shows a cross-sectional structure of the hologram recording medium HM.

Figure 2:
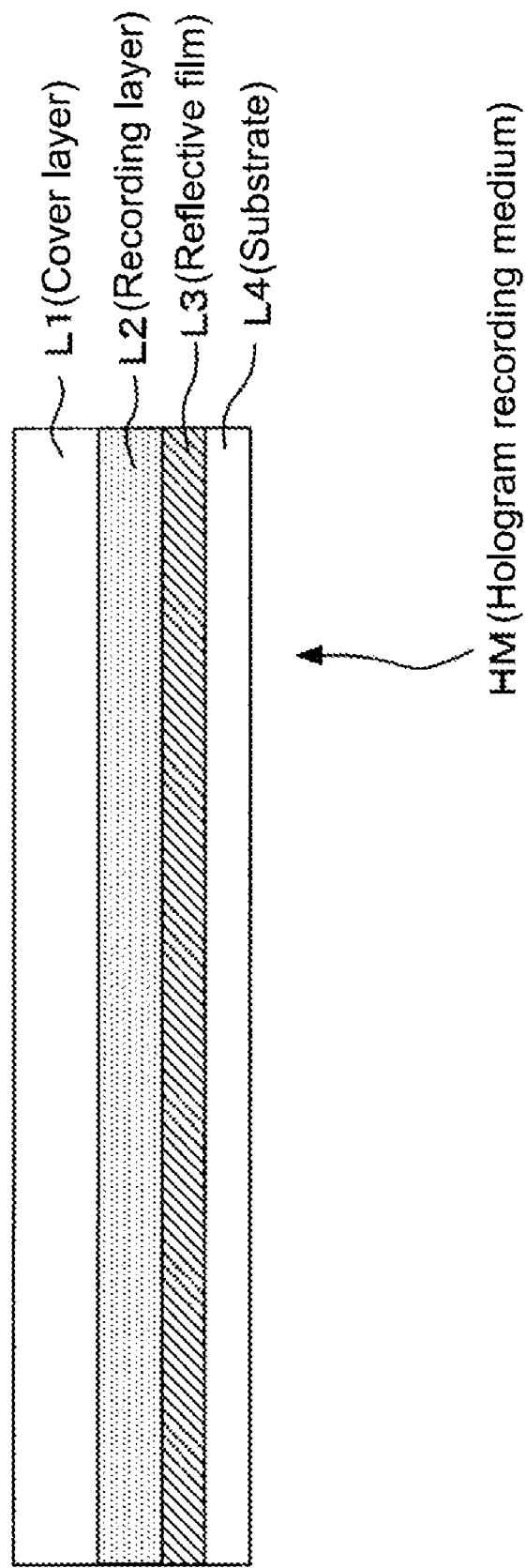
FIG. 2 is a cross-sectional diagram showing a structural example of a hologram recording medium used in the embodiment.

As shown in FIG. 2, in the hologram recording medium HM, a cover layer L1, a recording layer L2, a reflective film L3, and a substrate L4 are formed in the stated order from an upper-layer side to a lower-layer side.

It should be noted that, regarding the "upper layer" and the "lower layer" used herein, when a surface that recording/reproduction light enters is considered an upper surface and a surface on the other side of the upper surface is considered a lower surface, the upper-surface side is the upper layer and the lower-surface side is the lower layer.

The cover layer L1 is formed of, for example, plastic or glass, and is a protective substrate provided for protecting the recording layer L2 formed below the cover layer L1.

As a material of the recording layer L2, a material with which information recording can be performed by a refractive-index change corresponding to an intensity distribution of irradiation light, such as photopolymer, is selected, and hologram recording/reproduction that uses laser light from a laser diode (LD) 1 as a light source to be described later is carried out.

Further, the reflective film L3 is provided for causing, at a time a reproduced image (reproduction light) corresponding to a hologram recorded on the recording layer L2 is obtained in accordance with the irradiation of reference light during reproduction, the reproduced image to return to the apparatus side as reflected light.

The substrate L4 formed below the reflective film L3 is a protective substrate formed of, for example, plastic or glass.

Let us return to FIG. 1.

In the recording/reproduction apparatus, the hologram recording medium HM is held rotatably by a spindle motor (not shown). In the recording/reproduction apparatus, the hologram recording medium HM in such a held state is irradiated with laser light for recording/reproducing holograms.

An optical pickup including an optical system for irradiating laser light for recording/reproducing holograms to/from the hologram recording medium HM corresponds to a part surrounded by a broken line in the figure. Specifically, in the optical pickup, the laser diode 1, a collimation lens 2, a polarization beam splitter 3, an SLM 4, a polarization beam splitter 5, a relay lens 6, an aperture 12, a relay lens 7, a mirror 8, a partial diffractive device 9, a ¼ wavelength plate 10, an objective lens 11, and an image sensor 13 are provided.

The laser diode 1 outputs blue-violet laser light having a wavelength λ of, for example, about 405 nm as laser light for recording/reproducing holograms. The laser light emitted from the laser diode 1 enters the polarization beam splitter 3 via the collimation lens 2.

In the polarization beam splitter 3, out of mutually-orthogonal linear polarization components of incident laser light, one of the linear polarization components is caused to transmit therethrough whereas the other one of the linear polarization components is reflected. In this case, for example, a p polarization component is transmitted whereas an s polarization component is reflected.

Therefore, only the s polarization component of the laser light that has entered the polarization beam splitter 3 is reflected and guided to the SLM 4.

The SLM 4 includes, for example, a reflection-type liquid crystal device as an FLC (Ferroelectric Liquid Crystal) and controls a polarization direction of incident light in a pixel unit.

The SLM 4 carries out a spatial light modulation of changing or not changing the polarization direction of incident light 90° for each pixel in response to a drive signal from a modulation controller 14 shown in FIG. 1. Specifically, the SLM 4 is structured to control the polarization direction in a pixel unit in response to the drive signal so that an angle change of the polarization direction becomes 90° for pixels with the drive signal ON, and the angle change of the polarization direction becomes 0° for pixels with the drive signal OFF.

As shown in FIG. 1, light emitted from the SLM 4 (light reflected by SLM 4) reenters the polarization beam splitter 3.

Here, in the recording/reproduction apparatus shown in FIG. 1, a spatial light intensity modulation in a pixel unit (hereinafter, referred to as optical intensity modulation or simply intensity modulation) is carried out using the polarization direction control by the SLM 4 in a pixel unit and a property of selective transmission/reflection of the polarization beam splitter 3 that corresponds to the polarization direction of incident light.

Figure 3A:
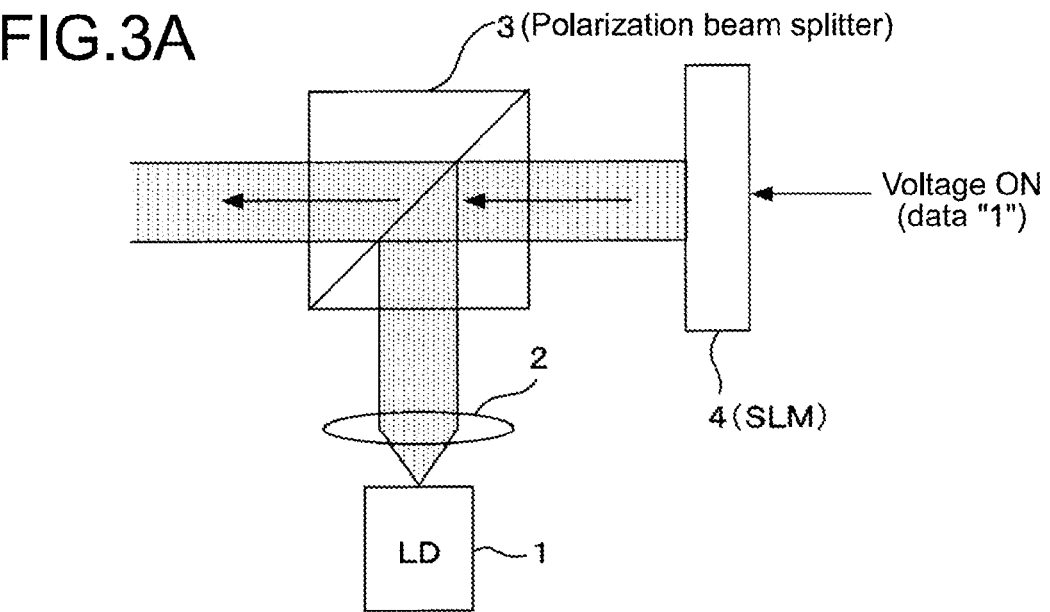
FIG. 3 are diagrams for explaining an intensity modulation that is realized with a combination of a polarization-direction-control-type spatial light modulator and a polarization beam splitter.
Figure 3B:
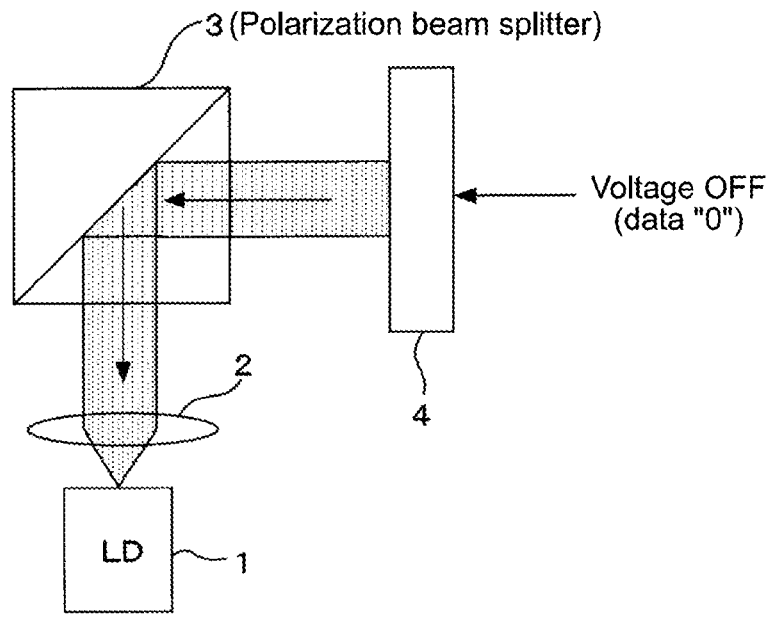

FIG. 3 are images of the intensity modulation that is realized by a combination of the SLM 4 and the polarization beam splitter 3 as described above. FIGS. 3A and 3B schematically show light-beam states of light of an ON pixel and light of an OFF pixel, respectively.

Since the polarization beam splitter 3 transmits p-polarized light and reflects s-polarized light as described above, the s-polarized light enters the SLM 4.

Under this presupposition, light of a pixel whose polarization direction has been changed 90° by the SLM 4 (light of pixel with drive signal ON) enters the polarization beam splitter 3 with a p polarization. Thus, light of the ON pixel in the SLM 4 is transmitted through the polarization beam splitter 3 and guided to the hologram recording medium HM side (FIG. 3A).

On the other hand, light of a pixel whose drive signal is OFF and whose polarization direction is not changed enters the polarization beam splitter 3 with an s polarization. In other words, light of an OFF pixel in the SLM 4 is reflected by the polarization beam splitter 3 and is thus not guided to the hologram recording medium HM side (FIG. 3B).

Thus, an intensity modulation portion that performs an optical intensity modulation in a pixel unit is formed by the combination of the SLM 4 as a polarization-direction-control-type spatial light modulator and the polarization beam splitter 3.

Here, the recording/reproduction apparatus of this embodiment adopts a coaxial system as the hologram recording and reproduction system. Specifically, signal light and reference light are arranged on the same optical axis and irradiated onto the hologram recording medium set at a predetermined position via a common objective lens to thus record data by forming holograms. Moreover, by irradiating the reference light onto the hologram recording medium via the objective lens during reproduction, a reproduced image of the holograms is obtained for reproducing recorded data.

Figure 4:
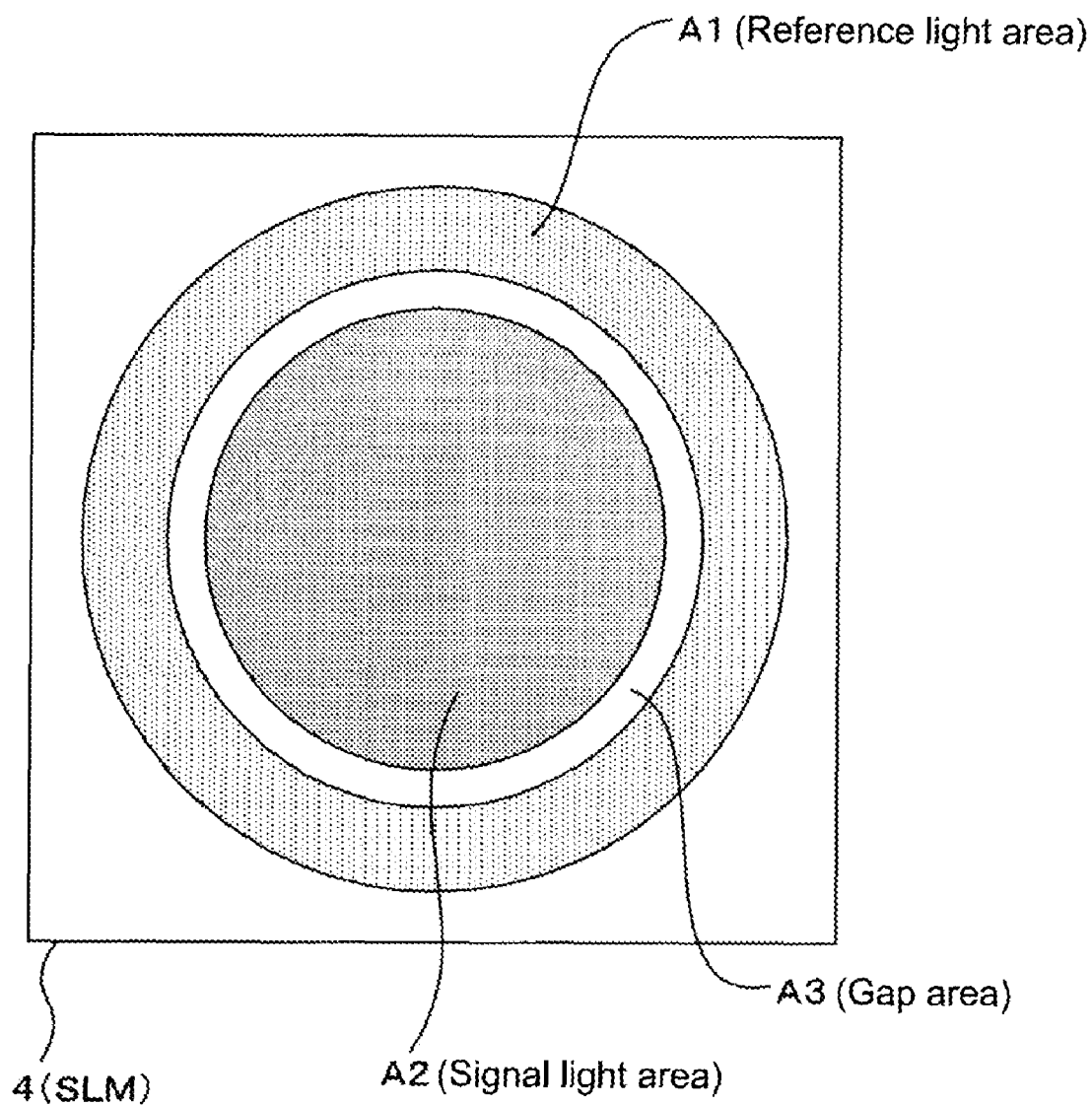
FIG. 4 is a diagram for explaining each of a reference light area, a signal light area, and a gap area set in the spatial light modulator.

When adopting the coaxial system, for arranging the signal light and the reference light on the same optical axis, areas as shown in FIG. 4 are set in the SLM 4.

As shown in FIG. 4, in the SLM 4, an area within a predetermined circular range that includes a center (coincides with center of optical axis) is set as a signal light area A2. In addition, on an outer side of the signal light area A2, an annular reference light area A1 is set with a gap area A3 interposed between the signal light area A2 and the reference light area A1.

By setting the signal light area A2 and the reference light area A1, light can be irradiated while arranging the signal light and the reference light on the same optical axis.

It should be noted that the gap area A3 is set as an area for preventing a situation where reference light generated in the reference light area A1 enters the signal light area A2 to thus become a noise with respect to signal light.

It should be noted that since a pixel configuration of the SLM 4 is a rectangle, the signal light area A2 is not circular to be exact. Similarly, the reference light area A1 and the gap area A3 are not annular to be exact. In this sense, the signal light area A2 is an almost-circular area, and the reference light area A1 and the gap area A3 are almost-annular areas.

In FIG. 1, the modulation controller 14 generates signal light and reference light during the recording and generates only the reference light during the reproduction by controlling the drive of the SLM 4.

Specifically, during the recording, the modulation controller 14 generates a drive signal for setting an on/off pattern corresponding to supplied recording data for pixels in the signal light area A2 of the SLM 4, setting a predetermined on/off pattern for pixels in the reference light area A1 of the SLM 4, and turning off all the other pixels, and supplies the signal to the SLM 4. By the SLM 4 carrying out the spatial light modulation (polarization direction control) based on the drive signal, signal light and reference light arranged coaxially (same optical axis) are obtained as light emitted from the polarization beam splitter 3.

Moreover, during the reproduction, the modulation controller 14 controls the drive of the SLM 4 by a drive signal for setting the predetermined on/off pattern for the pixels in the reference light area A1 and turning off all the other pixels to thus generate only the reference light.

It should be noted that during the recording, the modulation controller 14 operates to generate an on/off pattern in the signal light area A2 for each of predetermined units of an input recording data string to successively generate signal light that stores data of each of the predetermined units of the recording data string. Accordingly, data recording in a hologram page unit (data unit recordable with single interference of signal light and reference light) is successively carried out with respect to the hologram recording medium HM.

Laser light subjected to the intensity modulation in the intensity modulation portion formed by the polarization beam splitter 3 and the SLM 4 enters the polarization beam splitter 5. The polarization beam splitter 5 is also structured to transmit the p-polarized light and reflect the s-polarized light. Thus, the laser light emitted from the intensity modulation portion (light transmitted through polarization beam splitter 3) is transmitted through the polarization beam splitter 5.

The laser light transmitted through the polarization beam splitter 5 enters a relay lens system constituted of the relay lens 6 and the relay lens 7. In this case, the aperture 12 is inserted between the relay lens 6 and the relay lens 7 in the relay lens system.

As shown in the figure, a light flux of the laser light transmitted through the polarization beam splitter 5 is condensed at a predetermined focal position by the relay lens 6, and the laser light flux as diffusion light after the condensation is converted into parallel light by the relay lens 7. The aperture 12 is provided at the focal position of the relay lens 6 (Fourier plane: frequency plane) and structured to transmit light within a predetermined range that centers on the optical axis and block other light.

By the aperture 12, a size of the hologram page recorded onto the hologram recording medium HM is restricted, with the result that a recording density of holograms (i.e., data recording density) is improved. Moreover, as will be described later, while a reproduced image from the hologram recording medium HM is guided to the image sensor 13 via the relay lens system during the reproduction, at this time, most of scattered light emitted from the hologram recording medium HM together with the reproduced image is blocked, and an amount of scattered light guided to the image sensor 13 is thus significantly reduced. In other words, the aperture 12 has both the function to improve the hologram recording density during the recording and the function to improve an SN ratio (S/N) by suppressing scattered light during the reproduction.

The optical axis of the laser light passed through the relay lens 7 is bent 90° so that the laser light is guided to the objective lens 11 via the partial diffractive device 9 and the ¼ wavelength plate 10.

The partial diffractive device 9 and the ¼ wavelength plate 10 are provided for preventing the reference light reflected by the hologram recording medium HM (reflected reference light) during the reproduction from being guided to the image sensor 13 to become a noise with respect to reproduction light.

It should be noted that an operation of suppressing reflected reference light by the partial diffractive device 9 and the ¼ wavelength plate 10 will be described later.

The laser light that has entered the objective lens 11 is irradiated so as to be condensed on the hologram recording medium HM.

It should be noted that although not shown, a position of the objective lens 11 in a focus direction and a tracking direction is controlled by a so-called biaxial-mechanism actuator, for example. Accordingly, control of a spot position or focal position of laser light becomes possible.

Here, as described above, during the recording, signal light and reference light are generated by the intensity modulation in the intensity modulation portion (SLM 4 and polarization beam splitter 3) and irradiated onto the hologram recording medium HM through the path described above. With this structure, holograms onto which recording data is reflected are formed on the recording layer L2 of the hologram recording medium HM by interference fringes of the signal light and the reference light, to thus realize data recording.

Moreover, during the reproduction, only the reference light is generated by the intensity modulation portion and irradiated onto the hologram recording medium HM through the path described above. By thus irradiating the reference light, a reproduced image (reproduction light) corresponding to the holograms formed on the recording layer L2 can be obtained as reflected light from the reflective film L3. The reproduced image returns to the apparatus side via the objective lens 11.

Here, the reference light irradiated onto the hologram recording medium HM during the reproduction (referred to as outward reference light) enters the partial diffractive device 9 with the p polarization according to the operation of the intensity modulation portion. Since the partial diffractive device 9 is structured to transmit all the outward light as will be described later, the outward reference light of the p polarization passes through the ¼ wavelength plate 10. The outward reference light of the p polarization that has passed through the ¼ wavelength plate 10 as described above is converted into circular polarized light in a predetermined rotational direction and irradiated onto the hologram recording medium HM.

The reference light irradiated onto the hologram recording medium HM is reflected by the reflective film L3 and guided to the objective lens 11 as reflected reference light (inward reference light). At this time, since the rotational direction of the circular polarized light of the inward reference light is changed to a rotational direction opposite to the predetermined rotational direction by the reflection on the reflective film L3, the inward reference light is converted into s-polarized light by passing through the ¼ wavelength plate 10.

Here, based on such a shift of the polarization state, an operation of suppressing reflected reference light using the partial diffractive device 9 and the ¼ wavelength plate 10 will be described.

The partial diffractive device 9 is structured by forming, in an area that reference light enters (area excluding center portion), a polarization selection diffractive device that has selective diffraction characteristics (one of linear polarization components is diffracted and other one of linear polarization components is transmitted) corresponding to a polarization state of a linear polarization, such as a liquid crystal diffractive device. Specifically in this case, the polarization selection diffractive device included in the partial diffractive device 9 is structured to transmit p-polarized light and diffract s-polarized light. Thus, outward reference light is transmitted through the partial diffractive device 9, and only inward reference light is diffracted (suppressed) by the partial diffractive device 9.

As a result, it is possible to prevent the reflected reference light as inward light from being detected as a noise component with respect to a reproduced image to thus lower an SN ratio.

It should be noted that the area of the partial diffractive device 9 that the signal light enters (area that reproduced image enters) is formed of, for example, a transparent material, or is formed as a hole portion so as to transmit both outward light and inward light. Thus, the signal light in recording and the reproduced image in reproduction are transmitted through the partial diffractive device 9.

Here, as can be seen from the descriptions above, in the hologram recording and reproduction system, reference light is irradiated onto recorded holograms to obtain a reproduced image using a diffraction phenomenon. However, a diffraction efficiency in this case is generally smaller than 1%. Thus, the reference light that returns to the apparatus side as reflected light as described above has an extremely-high intensity with respect to a reproduced image. In other words, the reference light as the reflected light becomes a noise component that cannot be ignored in the detection of a reproduced image.

Therefore, by suppressing the reflected reference light by the partial diffractive device 9 and the ¼ wavelength plate 10 as described above, the SN ratio can be significantly improved.

The reproduction light obtained during the reproduction as described above is transmitted through the partial diffractive device 9. The reproduction light that has transmitted through the partial diffractive device 9 is reflected by the mirror 8 and enters the polarization beam splitter 5 thereafter via the relay lens 7, the aperture 12, and the relay lens 6 described above. As can be seen from the above description, since the reflected light from the hologram recording medium HM is converted into s-polarized light via the ¼ wavelength plate 10, the reproduction light that has thus entered the polarization beam splitter 5 is reflected by the polarization beam splitter 5 to be guided to the image sensor 13.

The image sensor 13 is constituted of an image pickup device such as a CCD (Charge Coupled Device) sensor and a CMOS (Complementary Metal Oxide Semiconductor) sensor and receives the thus-guided reproduction light from the hologram recording medium HM to obtain an image signal by converting the reproduction light into an electrical signal.

On the thus-obtained image signal, the on/off pattern (i.e., data pattern of "0" and "1") imparted to the signal light during the recording is reflected. In other words, the image signal thus detected by the image sensor 13 becomes a read-out signal for data recorded onto the hologram recording medium HM.

It should be noted that an internal structure of the image sensor 13 in this embodiment will be described later.

The image signal as the read-out signal obtained by the image sensor 13 is supplied to a data reproduction portion 15.

The data reproduction portion 15 carries out processing of identifying data of "0" and "1" for each value in a pixel unit of the SLM 4 that is contained in the image signal from the image sensor 13, processing of demodulating recorded modulation codes as necessary, and the like, and reproduces recording data.

With the structure described above, the hologram recording and reproduction operation that uses irradiation of recording/reproduction light from the laser diode 1 as the light source is realized.

<2. Behavior of Light in Optical Path>

Figure 5:
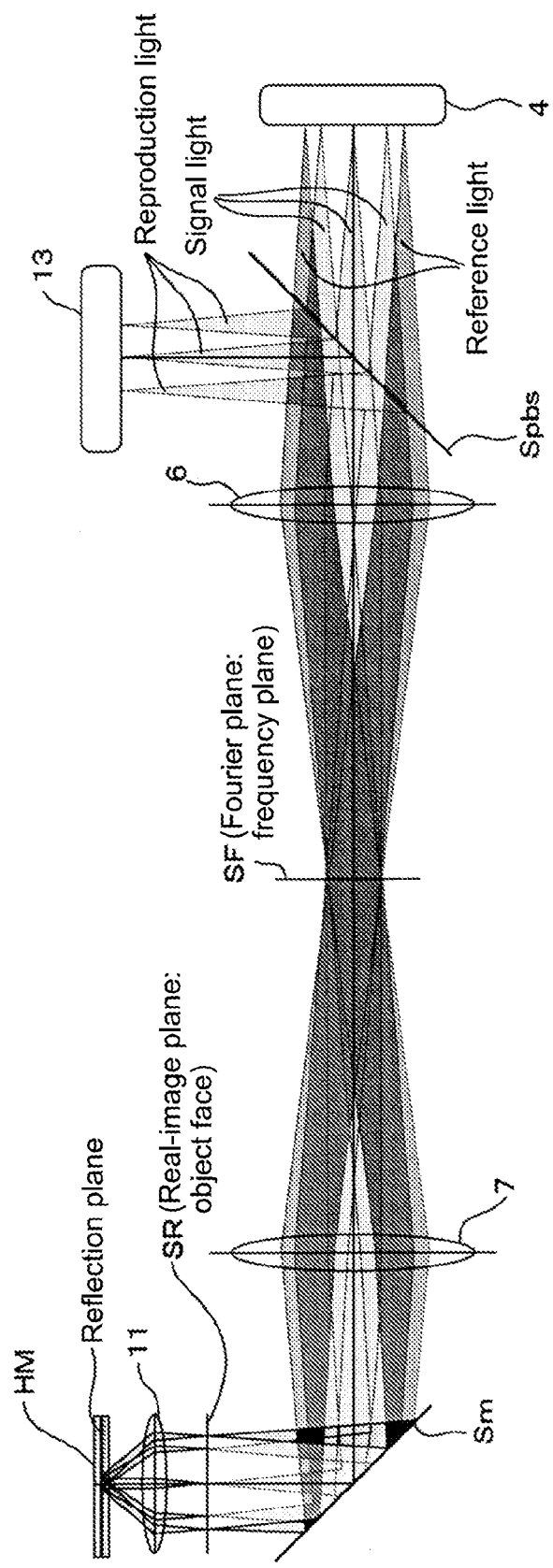
FIG. 5 is a diagram for explaining a behavior of light in an entire optical system shown in FIG. 1.

FIG. 5 shows a behavior of light in the entire optical system of the recording/reproduction apparatus shown in FIG. 1 for each light beam in a pixel unit of the SLM 4.

In FIG. 5, out of the entire structure of the optical system, only the SLM 4, the relay lens 6, the relay lens 7, the objective lens 11, and the image sensor 13 are illustrated. A plane Spbs in the figure represents a reflection plane of the polarization beam splitter 5, and a plane Sm represents a reflection plane of the mirror 8. Further, in the figure, the hologram recording medium HM is also illustrated.

In FIG. 5, for the light beams in pixel units, as representatives, only three light beams are illustrated for each of the signal light and the reproduction light, and only two light beams are illustrated as the reference light. Specifically, for the signal light and the reproduction light, a light beam of a pixel positioned at a center of the signal light area A2 (light beam including optical axis of entire laser light flux) and light beams of pixels positioned at an outermost circumferential portion of the signal light area A2 are illustrated as representatives. Moreover, for the reference light, light beams of pixels positioned at an outermost circumferential portion of the reference light area A1 are illustrated as representatives.

First, as shown in the figure, the light beams emitted from the pixels of the SLM 4 enter the relay lens 6 via the plane Spbs (polarization beam splitter 5) as diffusion light. At this time, optical axes of the light beams emitted from the pixels are parallel.

The light beams of the pixels that have entered the relay lens 6 are converted into parallel light from the diffusion light as shown in FIG. 5, and the optical axes of the light beams except the light beam on a laser optical axis (optical axis of entire laser light flux) are bent toward the laser optical axis. Thus, in a plane SF, the light beams are condensed as parallel light at the center portion including the laser optical axis. Here, similar to a focal plane of the objective lens 11, the plane SF is a plane on which the laser beams of the pixels as the parallel light are condensed on the laser optical axis, and is called a Fourier plane (frequency plane).

Here, as described above with reference to FIG. 1, the aperture 12 is provided on the focal plane of the relay lens 6. In other words, the aperture 12 is provided at a position corresponding to the Fourier plane SF in the optical system.

The light beams thus condensed as parallel light in the Fourier plane SF enter the relay lens 7. At this time, the light beams emitted from the relay lens 6 (excluding light beam of pixel at center portion including laser optical axis) cross the laser optical axis on the Fourier plane SF. Thus, a relationship between entering/exiting positions of the light beams in the relay lens 6 and the relay lens 7 become an axisymmetric relationship with the laser optical axis as a center.

The light beams are converted into convergent light as shown in the figure by passing through the relay lens 7, and the optical axes of the light beams become parallel. The light beams that have passed through the relay lens 7 are reflected by the plane Sm (mirror 8) and condensed at positions on a real-image plane SR. The real-image plane SR is an object face for the objective lens 11.

At this time, since the optical axes of the light beams that have passed through the relay lens 7 become parallel as described above, condensation positions of the light beams do not overlap on the real-image plane SR and are at different positions.

The light beams condensed on the real-image plane SR enter the objective lens 11 as diffusion light as shown in FIG. 5. The light beams as the diffusion light become parallel light by being passed through the objective lens 11, and the optical axes of the light beams (excluding light beam on laser optical axis) are bent toward the laser optical axis. Accordingly, the light beams are condensed at the center portion including the laser optical axis on the focal plane of the objective lens 11 formed on the hologram recording medium HM.

Here, on the focal plane of the objective lens 11, the light beams are converted into parallel light and condensed at one position. As can be seen from the above descriptions, the focal plane of the objective lens 11 and the Fourier plane SF are in a conjugate relationship.

It should be noted that FIG. 5 shows the light beams of reproduction light reflected by the plane Spbs and guided to the image sensor 13. The reason why only the reproduction light is guided to the image sensor 13 as described above is because reflected reference light is suppressed by the partial diffractive device 9 (and ¼ wavelength plate 10) described above.

It should be noted that the partial diffractive device 9 is provided at a position corresponding to the real-image plane SR. This is because, since the partial diffractive device 9 needs to selectively transmit/diffract light in the signal light area and the reference light area as described above, it becomes difficult to obtain an appropriate permselective/diffractive operation unless positioned at a position at which an image equivalent to that of the SLM 4 (image generation plane) can be obtained.

Further, during the reproduction, the reproduction light can be obtained in the same light beam area as the light beams of the signal light irradiated during the recording. In other words, the light beams of the reproduction light reach the plane Spbs following the same path as the light beams of the signal light in the figure and reflected thereafter by the plane Spbs to be guided to the image sensor 13. At this time, the light beams of the reproduction light emitted toward the plane Spbs from the relay lens 6 are convergent light as shown in the figure, and optical axes thereof are parallel. Further, the light beams are condensed at different positions on a detection plane of the image sensor 13. Thus, the same image as the reproduced image on the real-image plane SR can be obtained on the detection plane of the image sensor 13.

<3. Generation and Suppression of Scattered Light>

As described above, in the hologram recording and reproduction system, scattered light generated from the hologram recording medium HM during reproduction and scattered light due to dusts adhered onto a lens or the like in the optical system cause lowering of an SN ratio.

Here, it is possible to suppress the scattered light generated from the hologram recording medium HM by the aperture 12. Specifically, as can be seen from the descriptions on FIG. 5, since it is possible to selectively transmit light of an area that the light beams of the reproduction light obtained from the hologram recording medium HM passes by the aperture 12 provided on the Fourier plane SF, most of the components of scattered light obtained in other areas can be blocked by the aperture 12.

Moreover, not only the components of scattered light from the hologram recording medium HM but also components of scattered light generated in the optical device disposed on a front side (image pickup device being set as reference) of the aperture 12, such as the objective lens 11 and the relay lens 7, can be suppressed.

As can be seen from the descriptions above, when inserting the aperture 12 for reducing a hologram size in recording, scattered light generated at a portion on the front side of the aperture 12, such as scattered light from the hologram recording medium HM, can be suppressed during the reproduction.

However, scattered light generated at a portion on a rear side of the aperture 12, that is, the image pickup device side cannot be suppressed.

Figure 6:
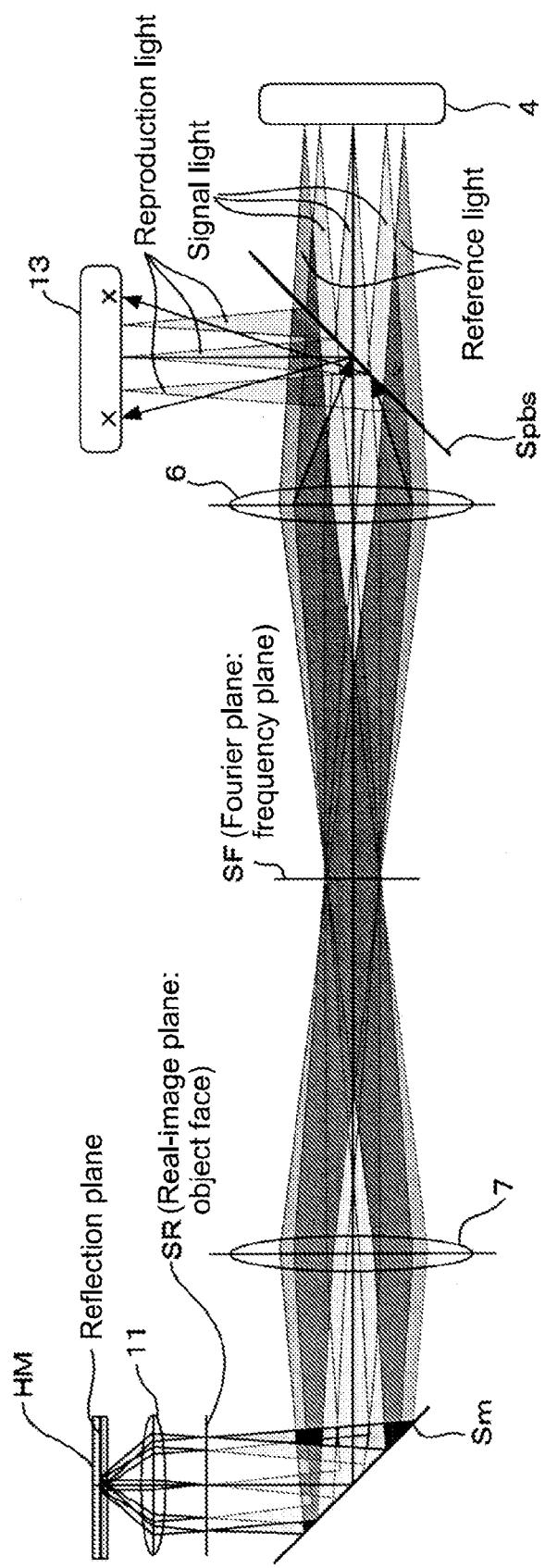
FIG. 6 is a diagram for explaining scattered light caused at a later stage than an aperture.

FIG. 6 is a diagram for explaining scattered light generated at the portion on the rear side of the aperture 12. It should be noted that similar to FIG. 5 above, FIG. 6 shows, out of the optical system, the SLM 4, the relay lens 6, the relay lens 7, the objective lens 11, the image sensor 13, the planes Spbs, SF, and Sm, the hologram recording medium HM, and light beams of signal light, reference light, and reproduction light.

For example, as indicated by the solid arrows of FIG. 6, scattered light is caused by dusts adhered onto the relay lens 6. As shown in the figure, the thus-generated scattered light is guided to the image sensor 13 together with reproduction light to thus cause lowering of an SN ratio unless some kind of a measure is taken.

(3-1. Method of Suppressing Scattered Light)

In this regard, this embodiment aims to suppress scattered light generated at the portion on the rear side of the aperture 12 in particular out of scattered light generated during reproduction.

Here, as indicated by the solid arrows of FIG. 6, most of the scattered light is guided to the image sensor 13 at an angle different from that of reproduction light. At this time, required for reproduction are, of course, only light beams of reproduction light. Therefore, if only light of the light beam portions that enter the image sensor 13 as convergent light as shown in the figure can be received by the image sensor 13, the scattered light can be suppressed maximumly.

In view of this point, in this embodiment, an angle permselective device that selectively transmits light with an incidence angle of a predetermined angle or less is provided in an optical path between the relay lens system and the image pickup device.

At this time, as shown in FIGS. 5 and 6, the light beams of the reproduction light guided to the image sensor 13 become light that converges at a certain angle (θ) with respect to the optical axis. Specifically, the incidence angle ranges from 0° to θ. Thus, if the angle permselective device that selectively transmits light with an incidence angle of a predetermined angle or less (i.e., blocks light with incidence angle exceeding predetermined angle) as described above is provided, most of the components of scattered light having an incidence angle larger than a maximum incidence angle θ of the reproduction light can be effectively suppressed.

Here, in the optical system structured to generate signal light and reference light using the spatial light modulator and irradiate them onto the hologram recording medium via the relay lens system and the objective lens like the optical system shown in FIG. 1, the maximum incidence angle θ of the light beams of the reproduction light can be defined as follows.

Figure 7:
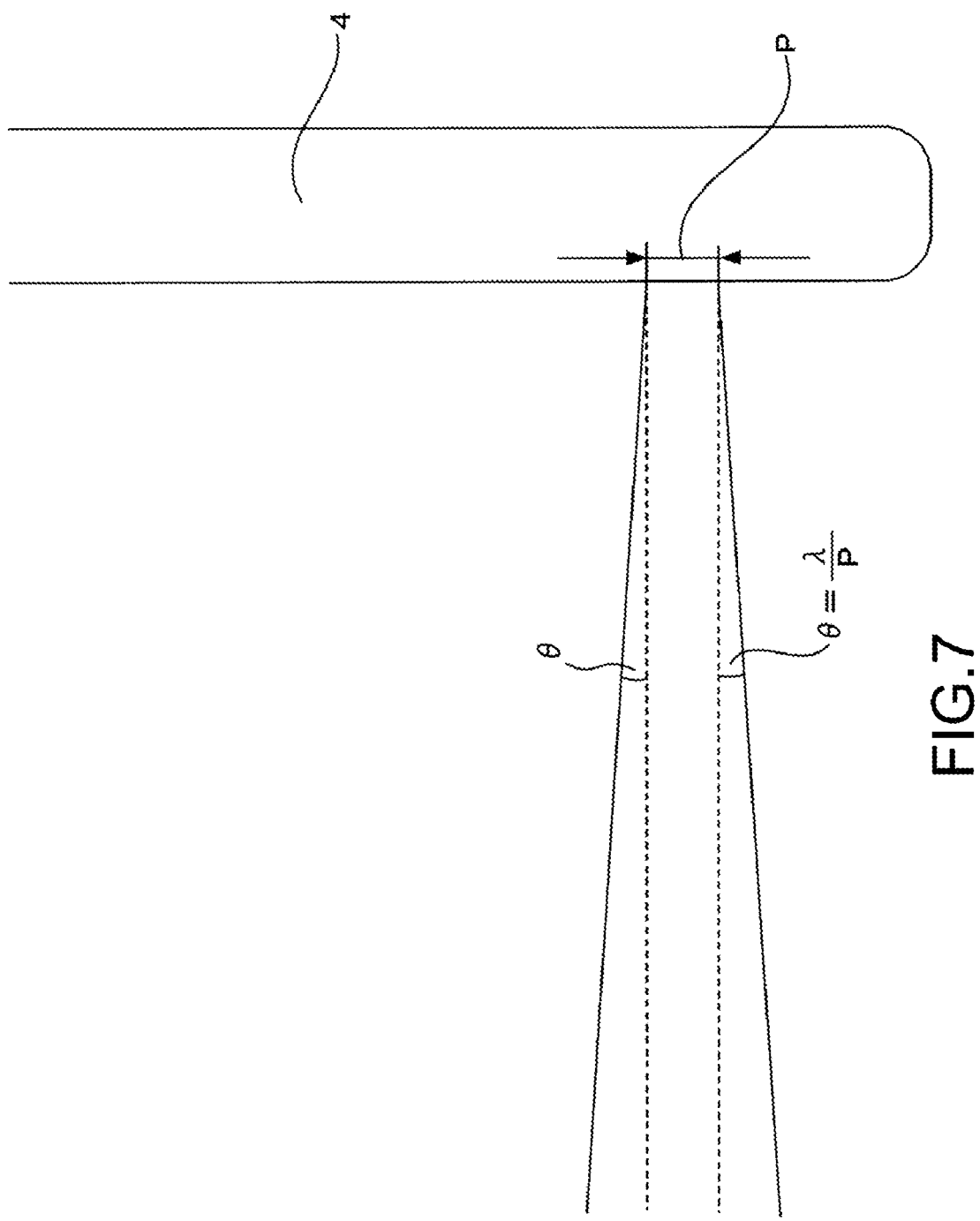
FIG. 7 is a diagram showing a light beam emitted from a certain pixel of the spatial light modulator.

FIG. 7 is a diagram showing a light beam emitted from a certain pixel of the SLM 4.

As shown in the figure, a spread angle θ of a light beam emitted from each pixel of the SLM 4 is expressed by "θ=λ/P", where P represents a pixel size of the spatial light modulator (SLM 4 in this case) and λ represents a wavelength of incident light with respect to the spatial light modulator.

Here, in the hologram recording and reproduction system that uses the coaxial system, as described above with reference to FIG. 5, the light beams of the reproduction light can be obtained in the same light beam areas as the light beams of the signal light irradiated during the recording. In other words, the optical system is designed to have such a structure. Thus, the maximum incidence angle of the light beams of the reproduction light that enter the image sensor 13 as convergent light is equal to the spread angle θ of the light beams emitted from the pixels of the SLM 4.

Figure 8:
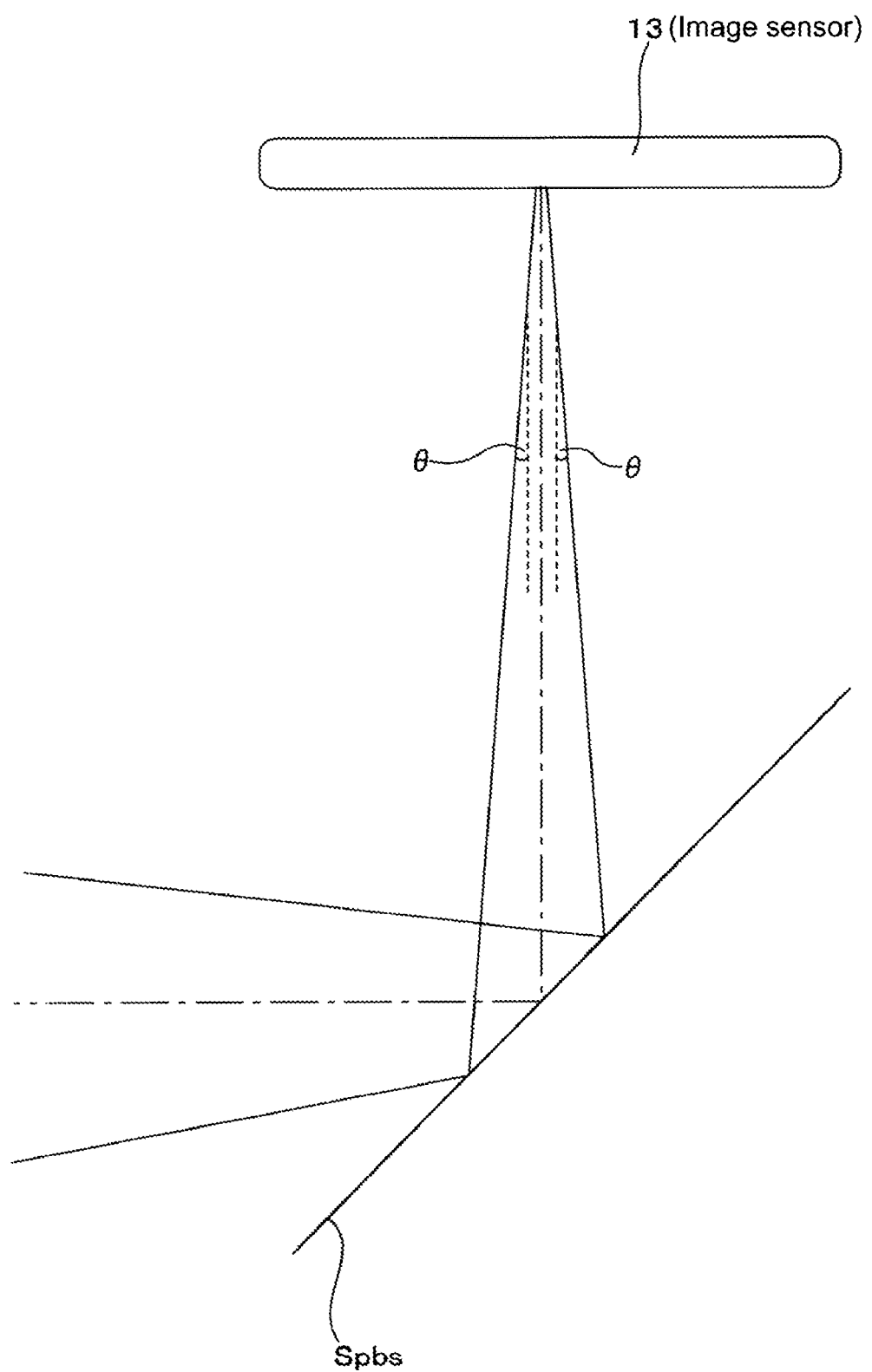
FIG. 8 is a diagram for explaining a maximum incidence angle of reproduction light guided to an image sensor (image pickup device)

FIG. 8 is a diagram for explaining the above description.

It should be noted that FIG. 8 shows only the center light beam out of the light beams of the reproduction light that enter the image sensor 13 via the plane Spbs.

In the optical system thus structured to generate signal light and reference light using the spatial light modulator and irradiate them onto the hologram recording medium via the relay lens system and the objective lens, the light beams of the reproduction light enter the image sensor 13 with the maximum incidence angle of θ=λ/P.

As described above, since the reproduction requires at least light with an incidence angle of θ or less, when scattered light is suppressed at maximum, the maximum incidence angle θ of light that is transmitted through the angle permselective device can be defined by λ/P.

(3-2. Specific Structural Example for Suppressing Scattered Light)

Figure 9:
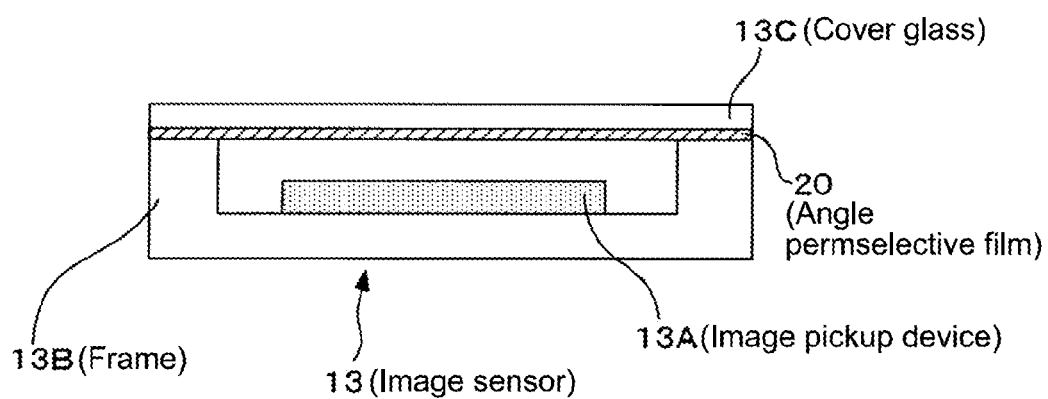
FIG. 9 is a diagram showing a cross-sectional structure of the image sensor of the recording/reproduction apparatus according to the embodiment.

Referring to FIG. 9, a specific structural example for suppressing scattered light will be described.

FIG. 9 shows a cross-sectional structure of the image sensor 13.

First, as shown in the figure, as a basic structure, the image sensor 13 includes a frame 13B, an image pickup device 13A disposed inside the frame 13B, and a cover glass 13C for protecting the image pickup device 13A.

In this embodiment, a film-like angle permselective device (angle permselective film 20) is deposited on the cover glass 13C of the image sensor 13 having such a structure.

Specifically, the angle permselective film 20 is deposited on a surface of the cover glass 13C on a side closer to the image pickup device 13A (surface opposed to image pickup device 13A).

By thus providing the angle permselective film 20 on the surface of the cover glass 13C opposed to the image pickup device 13A, that is, providing the angle permselective film 20 at a position closest to the image pickup device 13A, an effect of suppressing scattered light can be additionally improved.

In other words, since the cover glass 13C is also a portion at which scattered light may be caused, when the angle permselective device is provided on the front side of the cover glass 13C, scattered light caused by the cover glass 13C cannot be suppressed. In this sense, it is desirable to provide the angle permselective device at a position that is close to the image pickup device 13A that receives reproduction light as much as possible.

Figure 10:
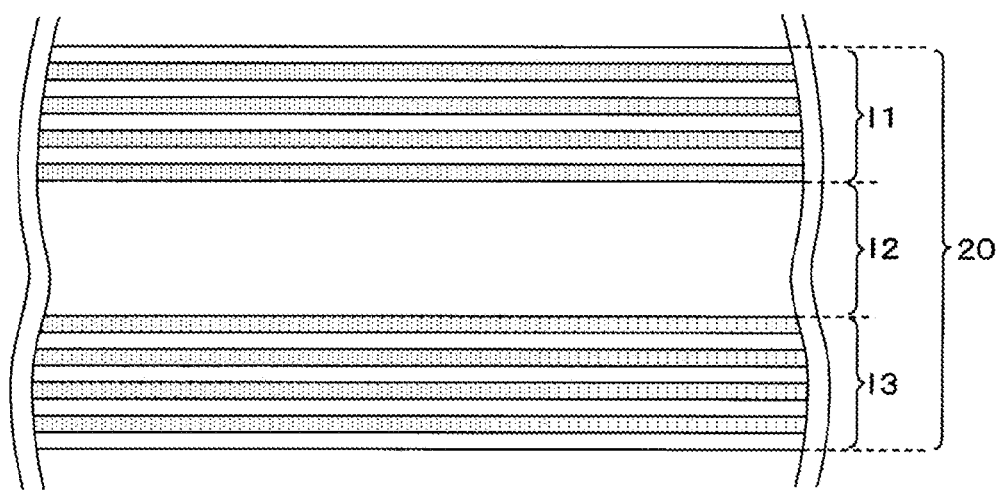
FIG. 10 is a diagram showing a specific structural example of an angle permselective film.

FIG. 10 is a diagram showing a specific structural example of the angle permselective film 20.

As shown in FIG. 10, the angle permselective film 20 can be realized by a multilayer structure. Specifically, the angle permselective film 20 in this case has a multilayer structure in which a $TiO_2$ layer (white layer in figure) and an $MgF_2$ layer are laminated alternately.

In the example shown in FIG. 10, at an upper-layer portion 11 in the multilayer structure of the angle permselective film 20, the $TiO_2$ layers and the $MgF_2$ layers are laminated four each in the stated order, that is, a total of 8 layers are formed. At an intermediate-layer portion 12 below the upper-layer portion 11, a single $TiO_2$ layer is formed. Further, at a lower-layer portion 13 below the intermediate-layer portion 12, the $MgF_2$ layers and the $TiO_2$ layers are laminated four each in the stated order, that is, a total of 8 layers are formed.

In this case, a thickness of each of the layers in the upper-layer portion 11 and the lower-layer portion 13 is set to be ¼ the wavelength λ of the recording/reproduction light. Moreover, a thickness of the $TiO_2$ layer formed in the intermediate-layer portion 12 is set to be 6 times the thickness of each layer in the upper-layer portion 11 and the lower-layer portion 13, that is, ½ the wavelength λ of the recording/reproduction light.

Furthermore, a refractive index of the $MgF_2$ layer is 1.38, whereas that of the $TiO_2$ layer is 2.3.

Figure 11:
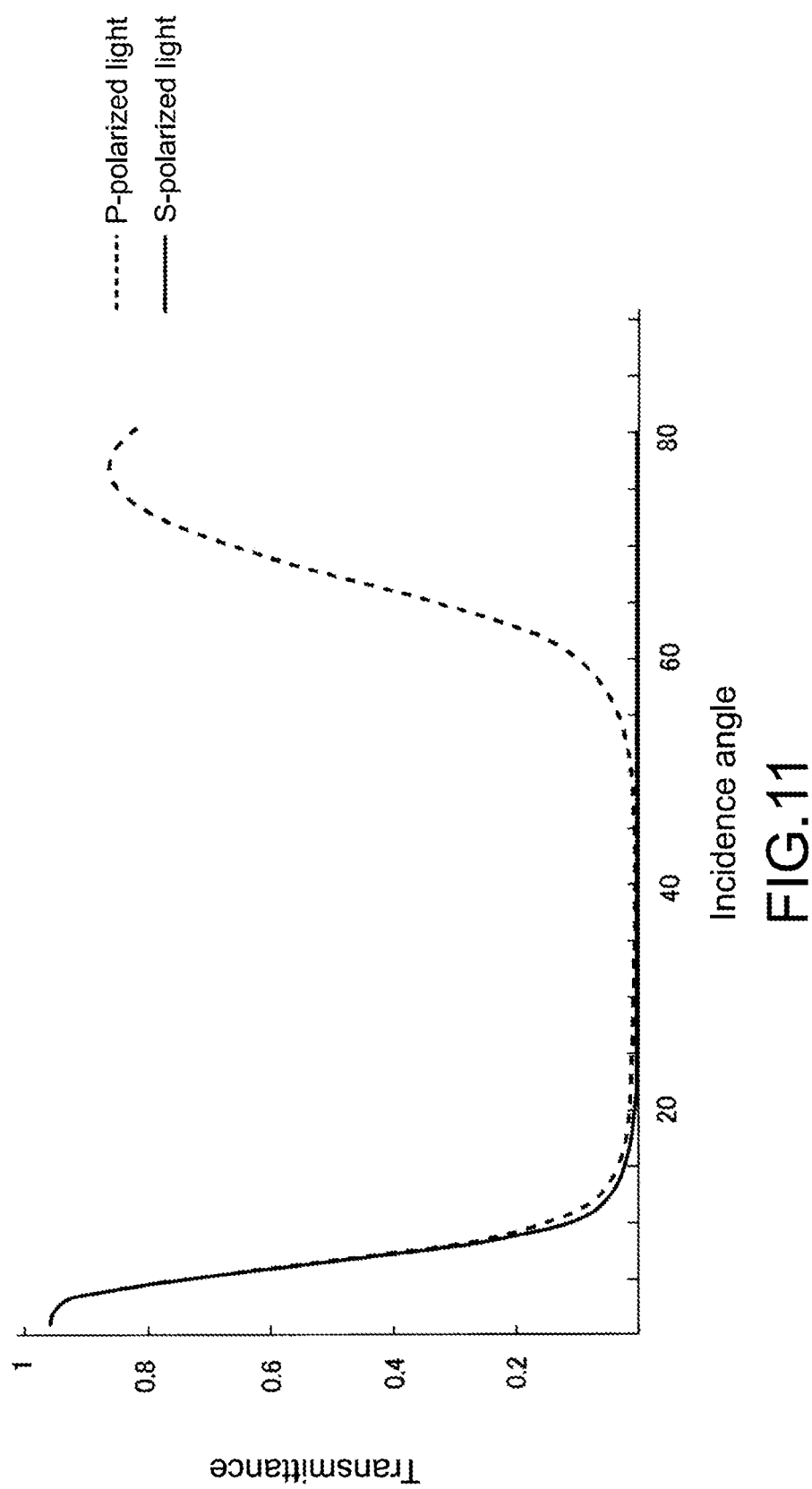
FIG. 11 is a diagram showing permeability/impermeability of the angle permselective film shown in FIG. 10.

FIG. 11 shows permeability/impermeability of the angle permselective film 20 shown in FIG. 10 having the multilayer structure. It should be noted that in the figure, characteristics in the solid line are characteristics with respect to s-polarized light, whereas characteristics in the broken line are characteristics with respect to p-polarized light. FIG. 11 shows permeability/impermeability with the abscissa axis representing an incidence angle and the ordinate axis representing a transmittance.

As can be seen from the characteristics shown in FIG. 11, according to the angle permselective film 20 having the structure described above with reference to FIG. 10, with respect to both the p-polarized light and the s-polarized light, the transmittance starts to decrease precipitously at the incidence angle of 2° to 3° and becomes almost 0 at the incidence angle of 20° or more. Here, with the structure of the optical system shown in FIG. 1, reproduction light enters the image sensor 13 with an s polarization. However, as shown in the figure, with respect to the s-polarized light in particular, the transmittance is maintained near 0 even when the incidence angle is 50° or more.

As described above, the incidence angle θ of the light beams of the reproduction light that enter the image sensor 13 is expressed by θ=λ/P, where P represents the pixel size of the SLM 4 and λ represents the recording/reproduction wavelength. As described above, in the recording/reproduction apparatus shown in FIG. 1, the recording/reproduction wavelength λ is set to 405 nm (0.405 μm). At this time, assuming that the pixel size P is 6 μm, the incidence angle θ becomes θ=3.867° based on $$0.405/6=0.0675 \text{ rad}.$$

According to the angle permselective film 20 having the structure described above with reference to FIG. 10, by the characteristics shown in FIG. 11, reproduction light can be selectively transmitted as appropriate even in a case where the conditions as described above are set on the recording/reproduction apparatus side, for example.

Here, when using the angle permselective film 20 having the multilayer structure as shown in FIG. 10, for example, an angle to be a boundary between permeableness and impermeableness can be adjusted by the settings of the material (refractive index) and thickness of the layers constituting the angle permselective film 20. Moreover, a trailing edge angle of the transmittance (decrease rate of transmittance with respect to incidence angle at portion at which transmittance decreases precipitously in FIG. 11) can be adjusted by the number of laminated layers.

As the angle permselective film 20, a film structured to selectively transmit at least light with the incidence angle of θ or less (ideally, transmit only light with incidence angle of θ or less) in accordance with the maximum incidence angle θ of the reproduction light that depend on the recording/reproduction wavelength λ and the pixel size P of the spatial light modulator only needs to be used.

It should be noted that the structure of angle permselective device shown in FIG. 10 is no more than a mere example, and the angle permselective device can of course be realized by other structures.

4. Modified Example

The embodiment of the present invention has been described heretofore. However, the present invention is not limited to the specific examples described heretofore.

For example, in the above descriptions, the case where the angle permselective device is deposited on the cover glass of the image pickup device that receives reproduction light has been exemplified. However, the angle permselective device may be provided in at least the optical path between the relay lens system and the objective lens when taking into account the suppression of scattered light caused in the path on the rear side of the aperture 12.

Figure 12:
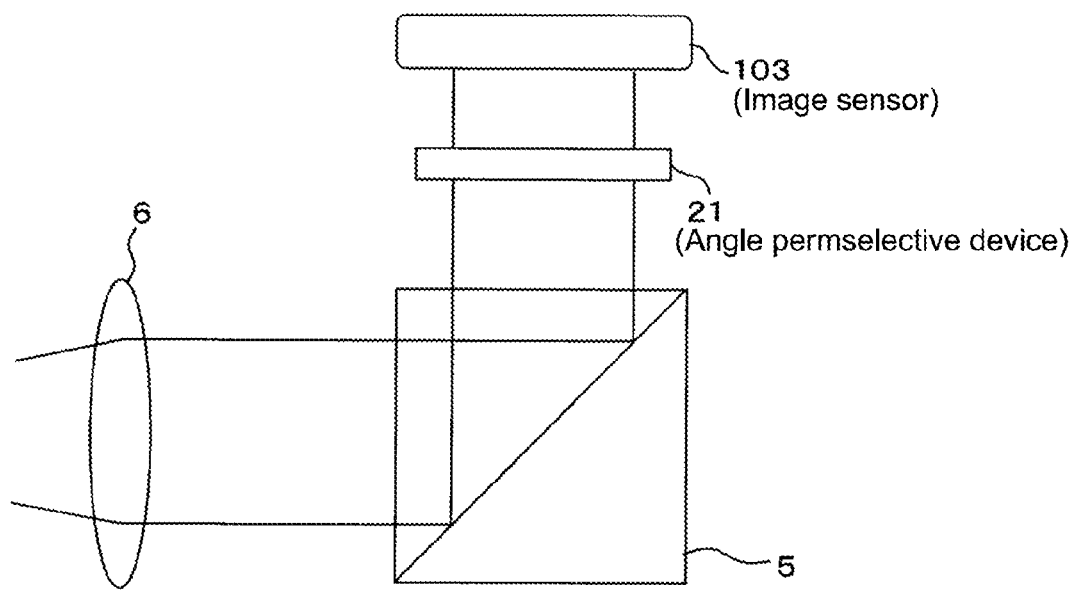
FIG. 12 is a diagram showing a modified example on an insertion position of the angle permselective film.
Figure 13:
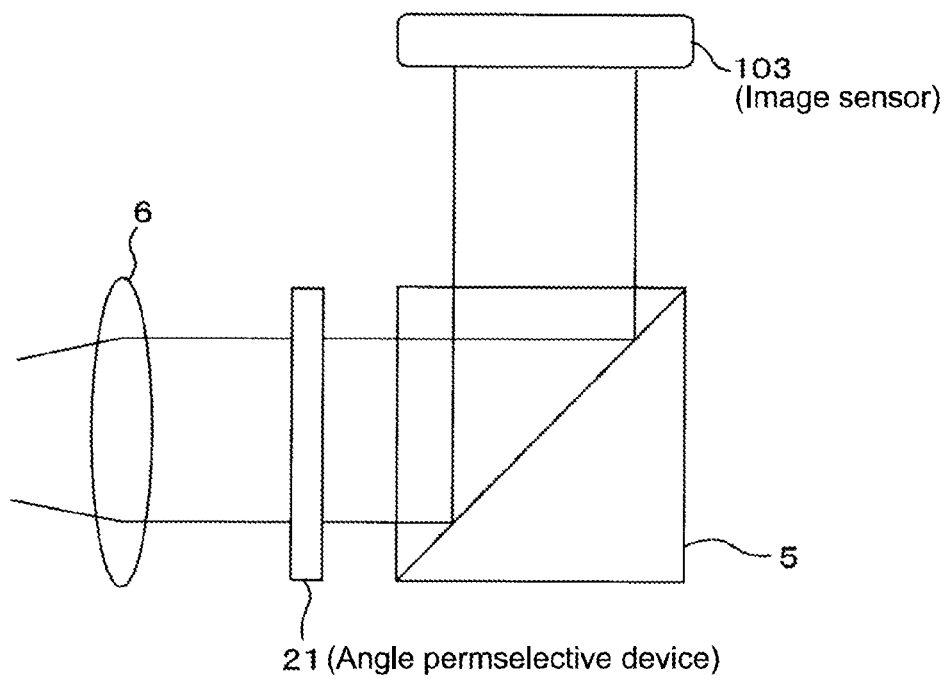
FIG. 13 is a diagram showing another modified example on the insertion position of the angle permselective film.

Specifically, the angle permselective device (angle permselective device 21) can be provided between the polarization beam splitter 5 and an image sensor 103 as shown in FIG. 12 or inserted between the relay lens 6 and the polarization beam splitter 5 as shown in FIG. 13.

It should be noted that the image sensor 103 shown in FIGS. 12 and 13 is an image sensor obtained by removing the angle permselective film 20 from the image sensor 13. Moreover, as a specific structure of the angle permselective device 21, a structure in which the angle permselective film 20 is deposited on a glass substrate can be adopted, for example.

Further, in the descriptions above, the case where the aperture 12 is provided for reducing the hologram size in recording and scattered light from the hologram recording medium HM caused during reproduction is suppressed by the aperture 12 has been exemplified. However, when assuming a reproduction-only apparatus, for example, the aperture for improving a recording density does not need to be inserted, and a structure from which the aperture is removed is thus possible.

In such a case, the scattered light from the hologram recording medium is suppressed by the angle permselective device according to the present invention. In other words, according to the angle permselective device in this case, the effect of suppressing scattered light that is due to adhesion of dusts caused in the optical system and the effect of suppressing scattered light from the hologram recording medium can both be obtained.

Moreover, in the descriptions above, the example where the present invention is applied to the case where reproduction is performed with respect to the reflection-type hologram recording medium HM has been described. However, the present invention is also favorably applicable to a case where reproduction is performed with respect to a transmissive hologram recording medium HM that does not include a reflective film.

In the case of an application to the transmissive hologram recording medium, reproduction light is transmitted through the entire hologram recording medium to exit the hologram recording medium from a side opposite to a side irradiated with reference light. Thus, in an optical system in this case, an objective lens that reproduction light as transmitted light enters and is provided on a back side of the hologram recording medium and a relay lens system that guides the reproduction light to the image pickup device via the objective lens are additionally provided.

Also in this case, if the angle permselective device is provided in the optical path between the relay lens system and the image pickup device, scattered light that is due to adhesion of dusts caused in the optical system can be suppressed effectively to thus improve an SN ratio.

Figure 14:
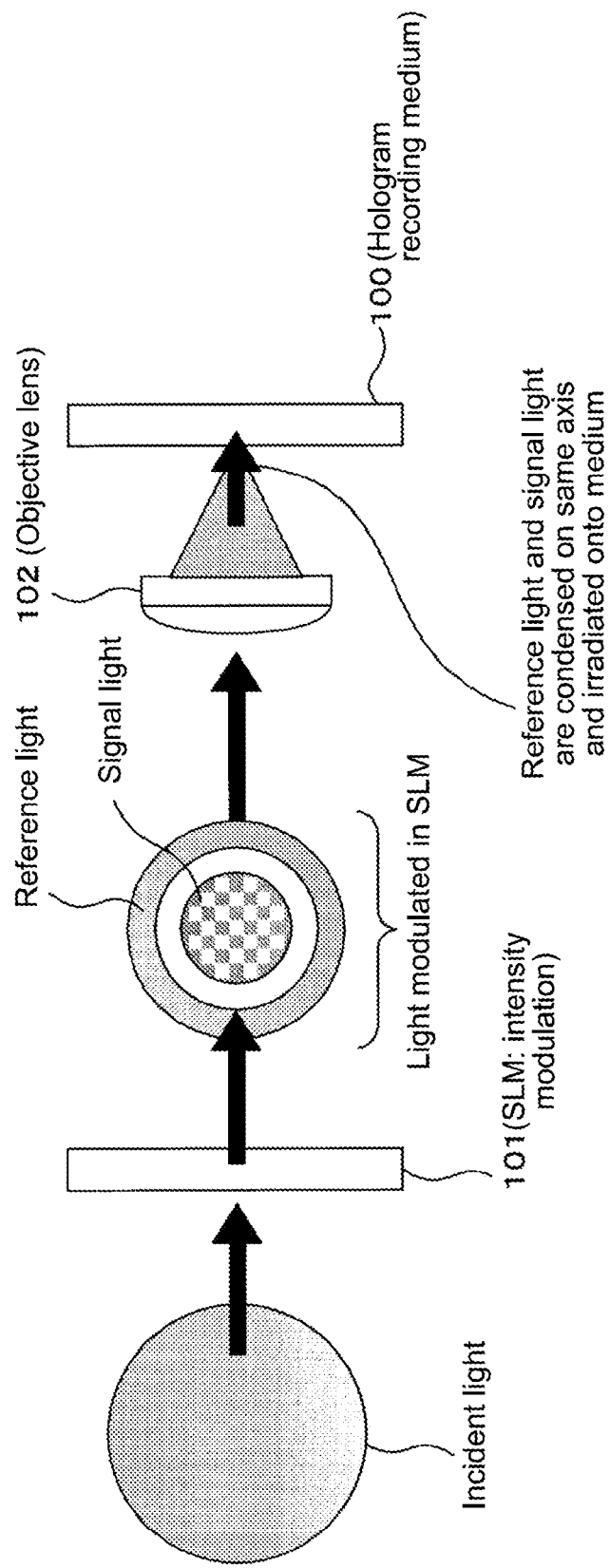
FIG. 14 is a diagram for explaining a hologram recording technique in a coaxial system.

Moreover, in the descriptions above, the case where the intensity modulation for generating reference light (and signal light) is realized by the combination of the polarization-direction-control-type spatial light modulator and the polarization beam splitter has been exemplified. However, the structure to realize the intensity modulation is not limited thereto. For example, the intensity modulation can also be realized by using a spatial light modulator capable of singly performing an intensity modulation, such as an SLM 101 and a DMD (Digital Micromirror Device) (registered trademark) of a transmissive liquid crystal panel described with reference to FIGS. 14 and 15, for example.

The present application contains subject matter related to that disclosed in Japanese Priority Patent Application JP 2009-000740 filed in the Japan Patent Office on Jan. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup apparatus, comprising:
a light source to irradiate light onto a hologram recording medium onto which information is recorded by interference fringes of signal light and reference light;
a spatial light modulation portion to generate the reference light by performing a spatial light modulation on the light from the light source; and
an optical system structured to irradiate the reference light generated by the spatial light modulation portion onto the hologram recording medium via a relay lens system and an objective lens and to guide reproduction light obtained from the hologram recording medium in accordance with the irradiation of the reference light to an image pickup device via the objective lens and the relay lens system, the optical system being provided with, in an optical path between the relay lens system and the image pickup device, an angle permselective device that selectively transmits light with an incidence angle of a predetermined angle or less.

2. The optical pickup apparatus according to claim 1, wherein the angle permselective device is formed as a film and deposited on a cover glass of the image pickup device.

3. The optical pickup apparatus according to claim 2,
wherein the angle permselective device is deposited on a surface of the cover glass on a side closer to the image pickup device.

4. The optical pickup apparatus according to claim 1,
wherein the spatial light modulation portion generates the signal light and the reference light during recording and generates the reference light during reproduction, and
wherein the optical system is provided with, at a position corresponding to a Fourier plane formed by the relay lens system, an aperture that is structured to block light other than light at a center portion including an optical axis.

5. The optical pickup apparatus according to claim 1,
wherein the angle permselective device selectively transmits, when an optical wavelength of the light source is represented by $\lambda$ and a pixel size of a spatial light modulator included in the spatial light modulation portion is represented by P, light with an incidence angle of $\lambda/P$ or less.

6. The optical pickup apparatus according to claim 1,
wherein the angle permselective device has a multilayer structure.

7. A reproduction apparatus, comprising:
an optical pickup including
   a light source to irradiate light onto a hologram recording medium onto which information is recorded by interference fringes of signal light and reference light,
   a spatial light modulation portion to generate the reference light by performing a spatial light modulation on the light from the light source, and
   an optical system structured to irradiate the reference light generated by the spatial light modulation portion onto the hologram recording medium via a relay lens system and an objective lens and to guide reproduction light obtained from the hologram recording medium in accordance with the irradiation of the reference light to an image pickup device via the objective lens and the relay lens system, the optical system being provided with, in an optical path between the relay lens system and the image pickup device, an angle permselective device that selectively transmits light with an incidence angle of a predetermined angle or less; and
a reproduction portion to reproduce the information recorded onto the hologram recording medium based on a result of the light reception by the image pickup device.

8. A reproduction method for a reproduction apparatus including an optical pickup that includes a light source to irradiate light onto a hologram recording medium onto which information is recorded by interference fringes of signal light and reference light, a spatial light modulation portion to generate the reference light by performing a spatial light modulation on the light from the light source, and an optical system structured to irradiate the reference light generated by the spatial light modulation portion onto the hologram recording medium via a relay lens system and an objective lens and to guide reproduction light obtained from the hologram recording medium in accordance with the irradiation of the reference light to an image pickup device via the objective lens and the relay lens system, the method comprising:
   selectively transmitting light with an incidence angle of a predetermined angle or less in an optical path between the relay lens system and the image pickup device in the optical system; and
   reproducing the information recorded onto the hologram recording medium based on a result of the light received by the image pickup device.

* * * * *